United States Patent
Sanchez et al.

(10) Patent No.: US 10,502,095 B2
(45) Date of Patent: *Dec. 10, 2019

(54) INTERNALLY COOLED SPOKE

(71) Applicant: United Technologies Corporation, Farmington, CT (US)

(72) Inventors: Paul K. Sanchez, Wellington, FL (US); Kalpendu J. Parekh, Colchester, CT (US); William A. Daniels, Marlborough, CT (US); John S. Tu, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 172 days.

This patent is subject to a terminal disclaimer.

(21) Appl. No.: 15/340,353

(22) Filed: Nov. 1, 2016

(65) Prior Publication Data
US 2017/0044985 A1 Feb. 16, 2017

Related U.S. Application Data

(63) Continuation of application No. 13/753,821, filed on Jan. 30, 2013, now Pat. No. 9,512,738, which is a
(Continued)

(51) Int. Cl.
*F02C 7/12* (2006.01)
*F01D 25/14* (2006.01)
(Continued)

(52) U.S. Cl.
CPC ............ *F01D 25/14* (2013.01); *F01D 25/12* (2013.01); *F01D 25/162* (2013.01); *F01D 25/24* (2013.01);
(Continued)

(58) Field of Classification Search
CPC .......... F23R 3/60; F01D 9/023; F01D 25/162; F01D 25/16; F01D 25/246; F01D 5/187; F02C 7/20
See application file for complete search history.

(56) References Cited

U.S. PATENT DOCUMENTS 2,620,157 A 12/1952 Morley et al.
2,829,014 A 4/1958 May
(Continued)

FOREIGN PATENT DOCUMENTS

EP 1378632 A2 1/2004
EP 1482130 A2 12/2004

OTHER PUBLICATIONS

International Search Report and Written Opinion from PCT Application Serial No. PCT/US2013/023753, dated Sep. 27, 2013, 8 pages.
(Continued)

*Primary Examiner* — Steven M Sutherland
(74) *Attorney, Agent, or Firm* — Kinney & Lange, P.A.

(57) ABSTRACT

A turbine engine includes a compressor section, a combustor section in fluid communication with the compressor section, a high pressure turbine in fluid communication with the combustor, a low pressure turbine in fluid communication with the high pressure turbine, and a mid-turbine frame located axially between the high pressure turbine and the low pressure turbine. The mid-turbine frame includes an outer frame case, an inner frame case, and a plurality of hollow spokes that distribute loads from the inner frame case to the outer frame case. The spokes are hollow to allow cooling airflow to be supplied through the spokes to the inner frame case.

10 Claims, 4 Drawing Sheets

Related U.S. Application Data continuation of application No. 13/361,480, filed on Jan. 30, 2012, now Pat. No. 9,316,117.

(51) Int. Cl.

| | | |
|---|---|---|
| *F01D 25/12* | (2006.01) | |
| *F01D 25/16* | (2006.01) | |
| *F01D 25/24* | (2006.01) | |
| *F02C 7/20* | (2006.01) | |
| *F02K 3/04* | (2006.01) | |

(52) U.S. Cl.
CPC .................. *F02C 7/12* (2013.01); *F02C 7/20* (2013.01); *F02K 3/04* (2013.01); *F01D 25/16* (2013.01); *F01D 25/246* (2013.01); *F05D 2220/36* (2013.01); *F05D 2260/20* (2013.01)

(56) References Cited

U.S. PATENT DOCUMENTS

| | | | |
|---|---|---|---|
| 2,869,941 | A | 1/1959 | Shoup, Jr. et al. |
| 2,919,888 | A | 1/1960 | Simmons |
| 3,312,448 | A | 4/1967 | Hull, Jr. et al. |
| 3,734,639 | A | 5/1973 | Short |
| 4,135,362 | A | 1/1979 | Glenn |
| 4,304,522 | A | 12/1981 | Newland |
| 4,478,551 | A | 10/1984 | Honeycutt, Jr. et al. |
| 4,979,872 | A | 12/1990 | Myers et al. |
| 4,987,736 | A | 1/1991 | Ciokajlo et al. |
| 5,076,049 | A | 12/1991 | VonBenken et al. |
| 5,160,251 | A | 11/1992 | Ciokajlo |
| 5,272,869 | A | 12/1993 | Dawson et al. |
| 5,292,227 | A | 3/1994 | Czachor et al. |
| 5,326,222 | A | 7/1994 | Matyscak et al. |
| 5,357,744 | A | 10/1994 | Czachor et al. |
| 5,438,756 | A | 8/1995 | Halchak et al. |
| 5,483,792 | A | 1/1996 | Czachor et al. |
| 5,517,817 | A | 5/1996 | Hines |
| 5,537,814 | A | 7/1996 | Nastuk et al. |
| 5,609,467 | A | 3/1997 | Lenhart et al. |
| 5,634,767 | A | 6/1997 | Dawson |
| 5,746,574 | A | 5/1998 | Czachor et al. |
| 6,217,279 | B1 | 4/2001 | Ai et al. |
| 6,227,799 | B1 | 5/2001 | Kuhn et al. |
| 6,267,553 | B1 | 7/2001 | Burge |
| 6,358,001 | B1 | 3/2002 | Bosel et al. |
| 6,439,841 | B1 | 8/2002 | Bosel |
| 6,450,763 | B1 | 9/2002 | Crum et al. |
| 6,547,518 | B1 | 4/2003 | Czachor et al. |
| 6,708,482 | B2 | 3/2004 | Seda |
| 6,835,044 | B2 | 12/2004 | Frosini |
| 6,860,716 | B2 | 3/2005 | Czachor et al. |
| 6,935,837 | B2 | 8/2005 | Moniz et al. |
| 7,011,493 | B2 | 3/2006 | Marchi et al. |
| 7,124,572 | B2 | 10/2006 | Aycock et al. |
| 7,195,447 | B2 | 3/2007 | Moniz et al. |
| 7,326,030 | B2 | 2/2008 | Albrecht et al. |
| 7,383,686 | B2 | 6/2008 | Aycock et al. |
| 7,673,461 | B2 | 3/2010 | Cameriano et al. |
| 7,797,946 | B2 | 9/2010 | Kumar et al. |
| 8,061,969 | B2 | 11/2011 | Durocher et al. |
| 8,091,371 | B2 | 1/2012 | Durocher et al. |
| 8,099,962 | B2 | 1/2012 | Durocher et al. |
| 8,245,518 | B2 | 8/2012 | Durocher et al. |
| 8,347,635 | B2 | 1/2013 | Durocher et al. |
| 8,500,392 | B2 | 8/2013 | Durocher et al. |
| 8,511,969 | B2 | 8/2013 | Durocher et al. |
| 2005/0132715 | A1 | 6/2005 | Allen, Jr. et al. |
| 2006/0123796 | A1 | 6/2006 | Aycock et al. |
| 2006/0130456 | A1* | 6/2006 | Suciu ............... F01D 5/066 60/226.1 |
| 2008/0022692 | A1 | 1/2008 | Nagendra et al. |
| 2010/0021286 | A1 | 1/2010 | Somanath et al. |
| 2010/0132371 | A1 | 6/2010 | Durocher et al. |
| 2010/0132372 | A1 | 6/2010 | Durocher et al. |
| 2010/0132373 | A1 | 6/2010 | Durocher et al. |
| 2010/0132374 | A1 | 6/2010 | Manteiga et al. |
| 2010/0132377 | A1 | 6/2010 | Durocher et al. |
| 2010/0135777 | A1 | 6/2010 | Durocher et al. |
| 2010/0303610 | A1 | 12/2010 | Wang et al. |
| 2011/0079019 | A1 | 4/2011 | Durocher et al. |
| 2013/0011242 | A1 | 1/2013 | Beeck et al. |

OTHER PUBLICATIONS

International Preliminary Report on Patentability from PCT Application Serial No. PCT/US2013/023753, dated Aug. 5, 2014, 5 pages.

Extended European Search Report for EP Application No. 13778601.8, dated Oct. 19, 2015, 5 pages.

Extended European Search Report, for European Patent Application No. 16203022.5, dated Apr. 10, 2017, 6 pages.

Extended European Search Report for EP Application No. 19175358.1, dated Jun. 28, 2019, 6 pages.

Communication of a Notice of Opposition for European Patent No. 2809919, dated Sep. 15, 2017, 36 pages.

\* cited by examiner

INTERNALLY COOLED SPOKE

CROSS-REFERENCE TO RELATED APPLICATION(S)

This application is a continuation of U.S. patent application Ser. No. 13/753,821, filed Jan. 20, 2013 and entitled "Internally Cooled Spoke", which is a continuation of U.S. patent application Ser. No. 13/361,480, filed Jan. 30, 2012 and entitled "Internally Cooled Spoke".

BACKGROUND

The present disclosure relates generally to a gas turbine engine, and in particular to a mid-turbine frame (MTF) included in a gas turbine engine.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

A turbine engine includes a compressor section, a combustor section in fluid communication with the compressor section, a high pressure turbine in fluid communication with the combustor, a low pressure turbine in fluid communication with the high pressure turbine, and a mid-turbine frame located axially between the high pressure turbine and the low pressure turbine. The mid-turbine frame includes an outer frame case, an inner frame case, and a plurality of hollow spokes that distribute bearing loads from the inner frame case to the outer frame case. The spokes are hollow to allow cooling airflow to be supplied through the spokes to the inner frame case.

DETAILED DESCRIPTION

Figure 1:
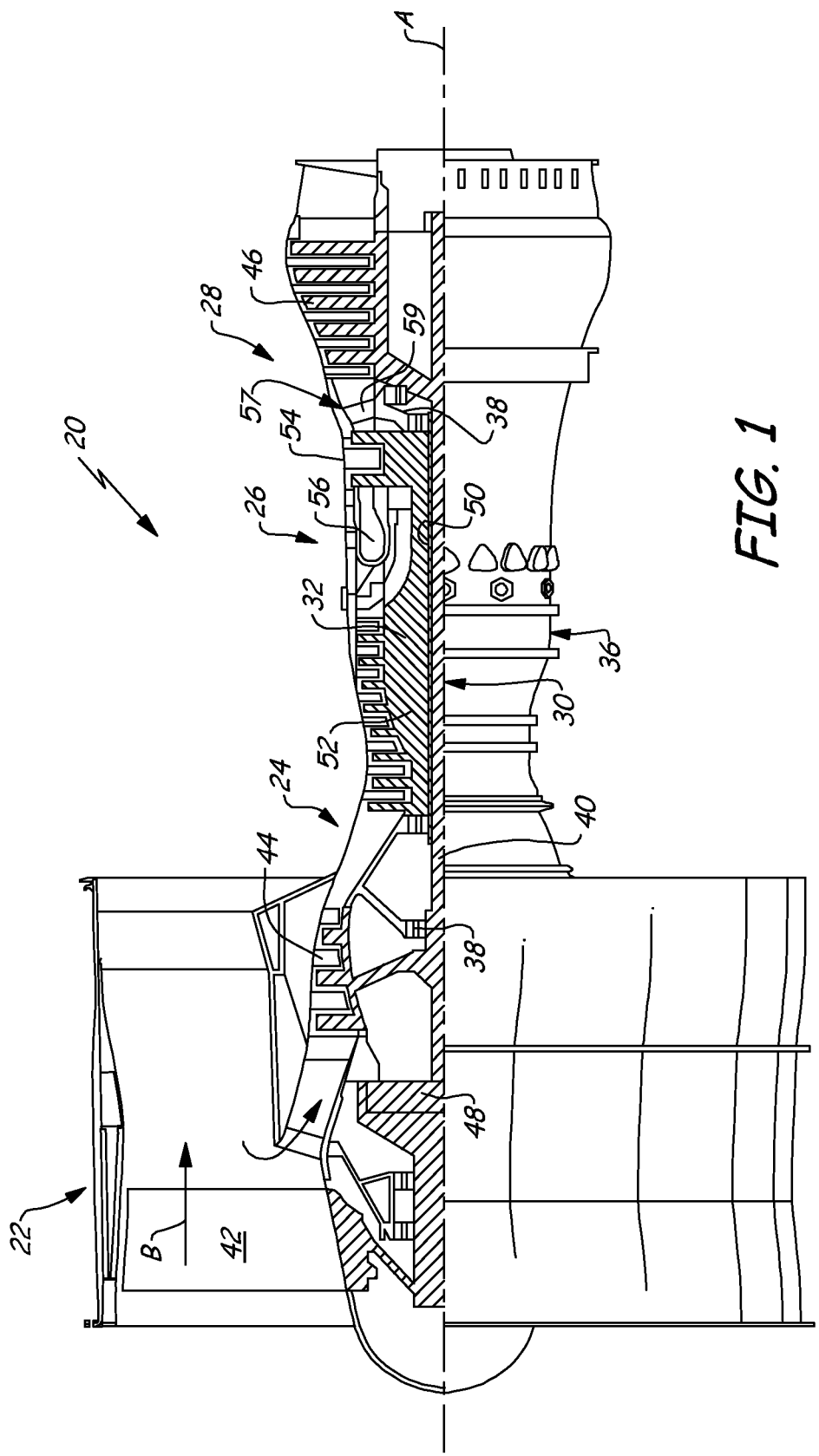
FIG. 1 is a schematic view of a gas turbine engine according to an embodiment of the present invention.

FIG. 1 is a schematic view of gas turbine engine 20 according to an embodiment of the present invention. Gas turbine engine 20 is disclosed herein as a two-spool turbofan that generally incorporates fan section 22, compressor section 24, combustor section 26 and turbine section 28, although alternative turbofan designs may benefit from the present invention. Fan section 22 drives air along a bypass flowpath while the compressor section 24 drives air along a core flowpath for compression and communication into the combustor section 26, and then expansion through the turbine section 28.

The engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that interconnects a fan 42, low pressure compressor 44 and low pressure turbine 46. Inner shaft 40 is connected to fan 42 through geared architecture 48 to drive fan 42 at a lower speed than low speed spool 30. High speed spool 32 includes outer shaft 50 that interconnects high pressure compressor 52 and high pressure turbine 54. Combustor 56 is arranged between high pressure compressor 52 and high pressure turbine 54. Mid-turbine frame 57 of the engine static structure 36 is arranged axially between high pressure turbine 54 and low pressure turbine 46. Mid-turbine frame 57 further supports bearing systems 38 in turbine section 28. Inner shaft 40 and outer shaft 50 are concentric and rotate via bearing systems 38 about the engine central longitudinal axis A which is collinear with their longitudinal axes.

The core airflow is compressed by low pressure compressor 44 and then by high pressure compressor 52, mixed and burned with fuel in combustor 56, then expanded over high pressure turbine 54 and low pressure turbine 46. Combustor 56 is therefore in fluid communication with the compressor section, to receive air compressed by low pressure compressor 44 and high pressure compressor 52. Mid-turbine frame 57 includes airfoils 59 which are in the core airflow path. Turbines 46 and 54 are in fluid communication with combustor 56, wherein the expanding gas provided by combustor 56 drives the respective low speed spool 30 and high speed spool 32.

Figure 2:
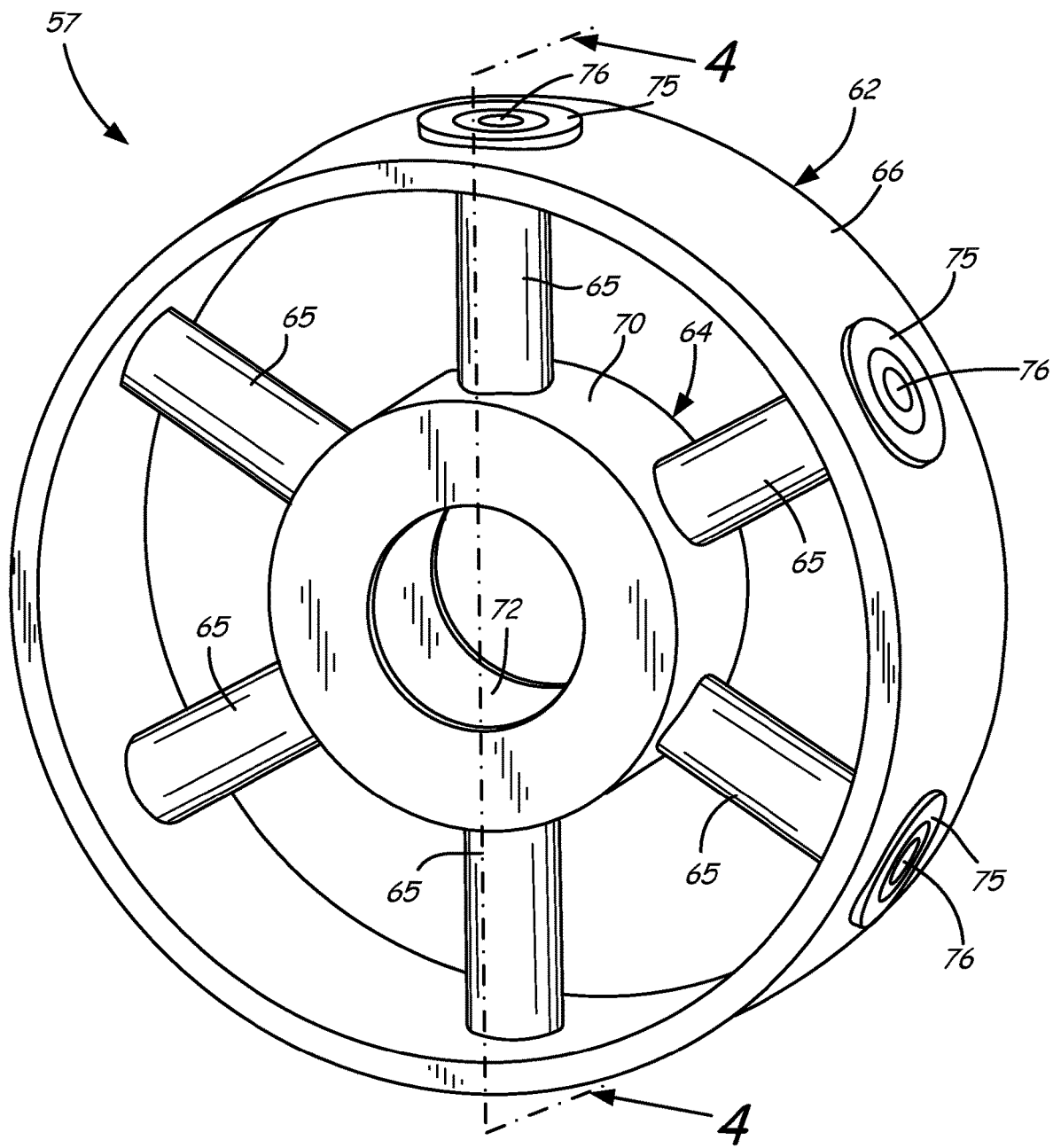
FIG. 2 is a perspective view of a mid-turbine frame (MTF) located in the gas turbine engine according to an embodiment of the present invention.

FIG. 2 is a perspective view of mid-turbine frame (MTF) 57 according to an embodiment of the present invention. MTF 57 includes outer frame case 62, inner frame case 64, and a plurality of hollow spokes 65. Outer frame case 62 includes an outer diameter portion 66. Inner frame case 64 includes an outer diameter portion 70 and inner diameter portion 72. In the embodiment shown in FIG. 2, six hollow spokes 65 are distributed evenly around the circumference of radial inner case 64 to provide structural support between inner frame case 64 and outer frame case 62.

Inner frame case 64 supports the rotor assembly via bearing assemblies 38 (shown in FIG. 1), and distributes the force from inner frame case 64 to outer frame case 62 via the plurality of hollow spokes 65. A number of arrangements are possible for attaching hollow spokes 65 to inner frame case 64. In one embodiment, inner frame case includes a plurality of apertures (not shown) for receiving each hollow spoke 65, and one or more bolts for attaching each hollow spoke 65 to inner frame case 64. Attachment of hollow spokes 65 to outer frame case 62 is provided at a plurality of bosses 75 located circumferentially around outer diameter surface 66 of outer frame case 62. In one embodiment, attachment of hollow spokes 65 at bosses 75 may be secured by a nut (not shown) that allows hollow spokes 65 to be tensioned. Apertures 76 formed in each of the plurality of bosses 75 allows cooling air to be distributed into a hollow portion (shown in FIG. 3) of each hollow spoke 65. In this way, cooling airflow is directed from the outer diameter through the hollow portion of cooled spoke 65 towards inner frame case 64. A metering plate (not shown) may be employed to meter or control the flow of cooling airflow into cooled spoke 65. Depending on the application, the size of the metering plate may be adjusted to selectively increase or decrease the volume of cooling air provided to hollow spokes 65. The volume of cooling airflow provided dictates the amount of cooling provided to hollow spokes 65.

Each of the plurality of hollow spokes 65 is subject to a varying temperature gradient caused by the expanding hot gases provided from high pressure turbine section 54 to low pressure turbine section 46 (shown in FIG. 1). If unmitigated, the temperature difference between each of the plurality of hollow spokes 65 results in a thermal growth differential between the plurality of spokes that affects the overall roundness of the engine relative to the centerline axis A (as shown in FIG. 1). The present invention utilizes hollow spokes that receive cooling airflow to mitigate the effects of the hot gas path. The cooling airflow creates a high heat transfer coefficient with the spoke as compared to the heat transfer coefficient outside of the spoke. The resulting difference in heat transfer coefficients results in the cooling airflow within each hollow spoke 65 being the dominant factor in the temperature of spokes 65.

Figure 3:
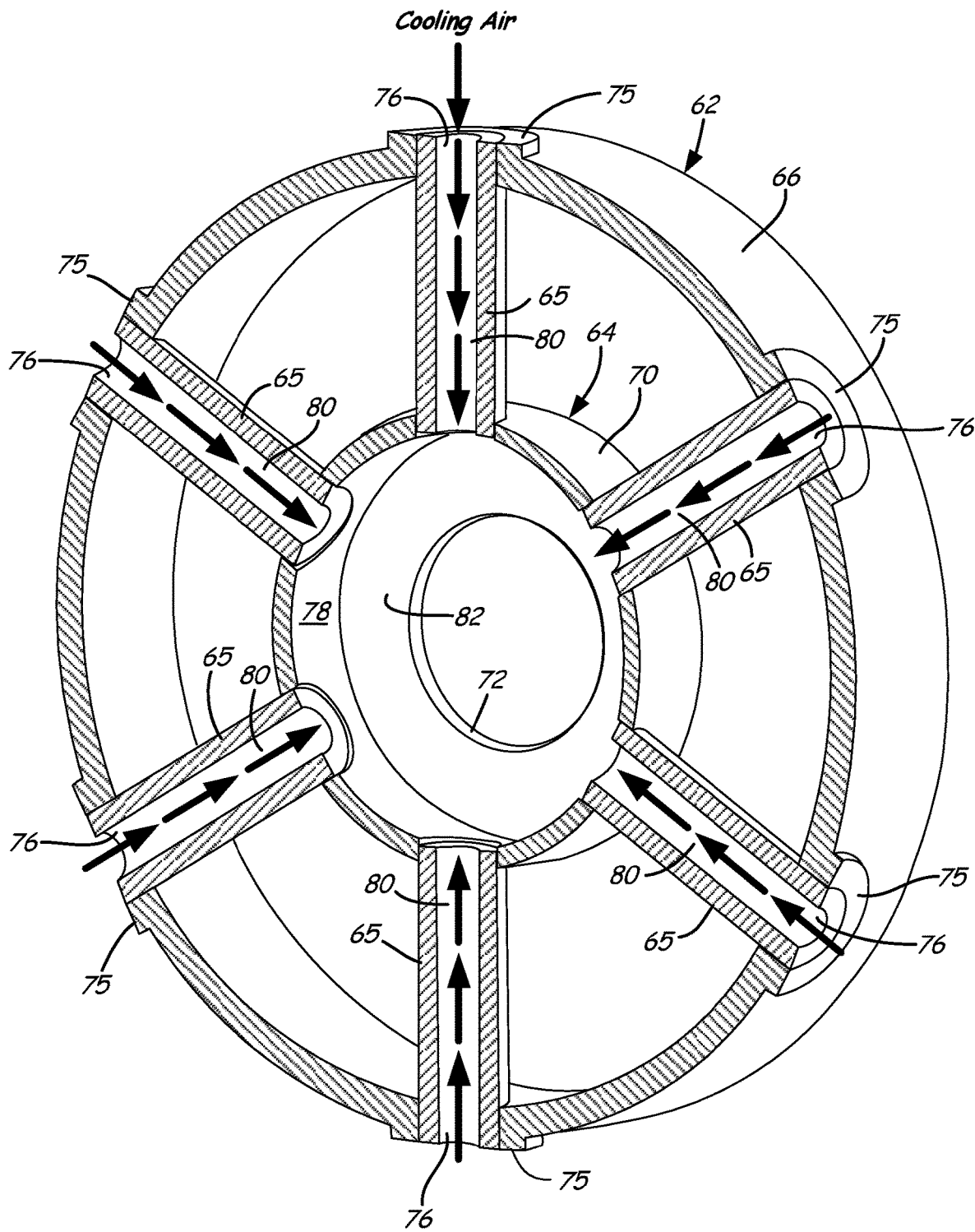
FIG. 3 is a cross-sectional view of mid-turbine frame (MTF) taken along line 3-3 of FIG. 4.
Figure 4:
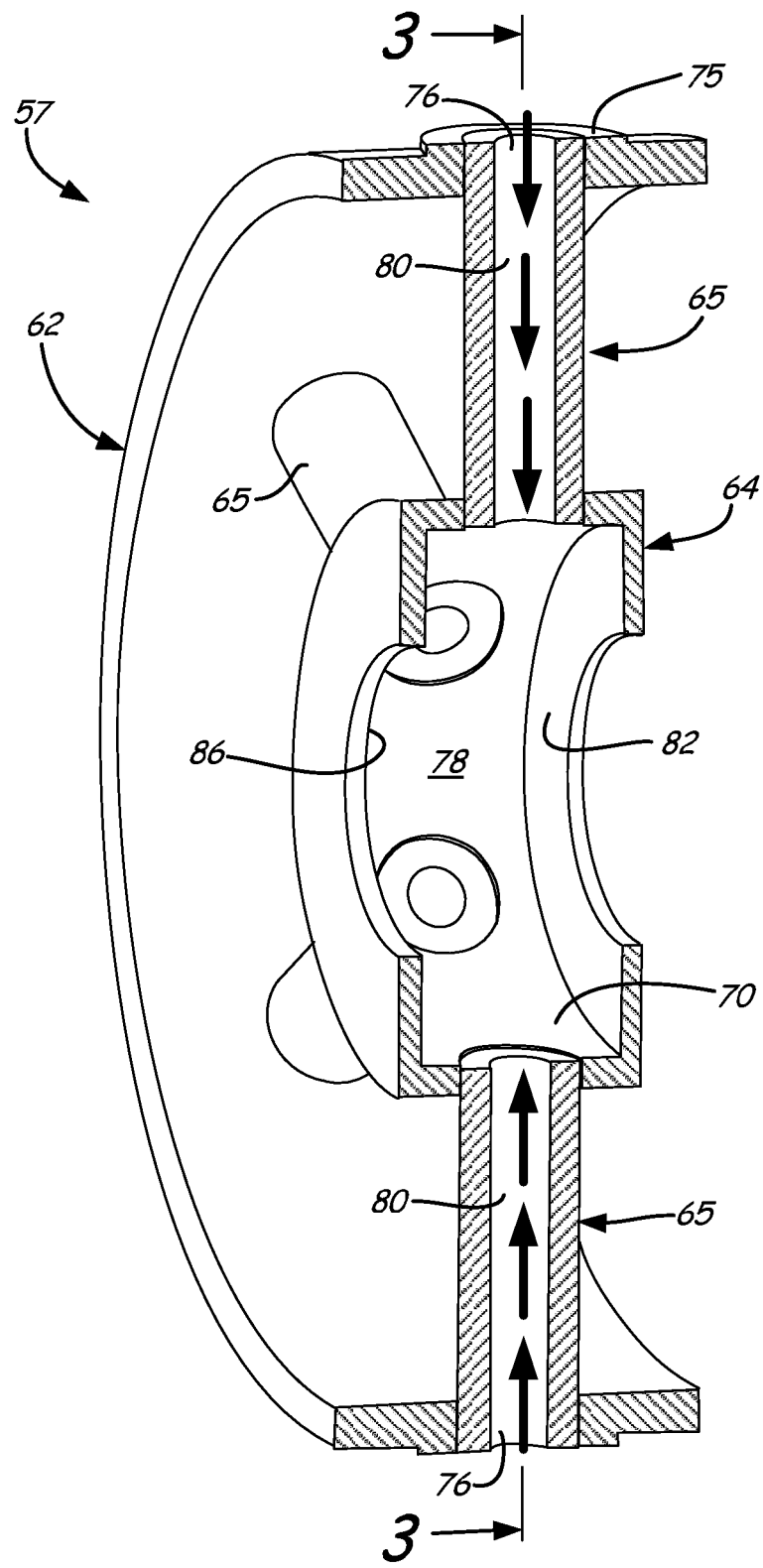
FIG. 4 is a cross-sectional view of mid-turbine frame (MFT) taken along line 4-4 of FIG. 2.

FIG. 3 is a cross-sectional view of mid-turbine frame (MTF) taken along line 3-3 of FIG. 4. FIG. 3 illustrates with respect to each cooled spoke 65 a hollow portion 80 that extends from a first end of cooled spoke 65 attached to the outer frame case 62 to a second end of cooled spoke 65 attached to the inner frame case 64. The cross-sectional view provided in FIG. 3 also illustrates manifold 78 provided within inner frame case 64 for receiving cooling air from each of the plurality of cooled spokes 65 as indicated by the direction of the arrows through hollow portion 80 of each cooled spoke 65. Manifold 78 is defined as the space between outer diameter portion 70 and inner diameter portion 72 of inner frame case 64, and between radial surface 82 and an opposing radial surface (not visible in this view) also of inner frame case 64. Cooling airflow is provided to manifold 78, which combines the cooling airflow from each of the plurality of hollow spokes 65. In one embodiment, airflow provided to manifold 78 is subsequently directed to cool a rotor portion located adjacent to manifold 78.

FIG. 4 is a cross-sectional view of mid-turbine frame (MTF) 57 taken along line 4-4 of FIG. 2 that illustrates the geometry of manifold 78. In particular, manifold 78 is defined by radial portions 82 and 86, outer diameter portion 70 and an inner diameter portion 72 (not visible in this view). Cooling airflow provided via cooled spokes 65 flows into manifold 78 as indicated by the direction of the plurality of arrows through hollow portions 80 of each cooled spoke 65. The present invention therefore compensates for temperature gradients in the mid-turbine frame of a gas turbine engine through utilization of hollow spokes for communicating load forces between an inner frame case and an outer frame case, while being cooled via cooling airflow provided through the hollow portion of each spoke.

While the invention has been described with reference to an exemplary embodiment(s), it will be understood by those skilled in the art that various changes may be made and equivalents may be substituted for elements thereof without departing from the scope of the invention. For example, although depicted as a turbofan gas turbine engine in the disclosed non-limiting embodiment, it should be understood that the concepts described herein are not limited to use with turbofans as the teachings may be applied to other types of turbine engines including three-spool architectures. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine engine comprising:
a combustor;
a first spool comprising a high pressure compressor connected to a high pressure turbine;
a second spool comprising a low pressure compressor connected to a low pressure turbine; and
a mid-turbine frame located axially between the high pressure turbine and the low pressure turbine, the mid-turbine frame having an outer frame case connected to an inner frame case via a plurality of cooled spokes, wherein each of the plurality of cooled spokes has a radially outer end and a radially inner end and is hollow within a spoke wall for supplying cooling airflow from outside the outer frame case to the inner frame case, wherein the inner frame case includes a manifold defined by an outer diameter annular portion, an inner diameter annular portion, first and second radial portions of the inner frame case that extend radially between the outer diameter annular portion and the inner diameter annular portion, and wherein a radially inner end of the spoke wall of each of the plurality of cooled spokes meets the outer diameter annular portion of the manifold at an opening in the outer diameter annular portion extending from a radially outer surface of the outer diameter annular portion and a radially inner surface of the outer diameter annular portion, and terminates between the radially outer surface of the outer diameter annular portion and the radially inner surface of the outer diameter annular portion to define an airflow path from each of the plurality of cooled spokes into the manifold that allows the manifold to receive and combine the cooling airflow from the plurality of cooled spokes.

2. The turbine engine of claim 1, wherein the mid-turbine frame includes three or more of the plurality of cooled spokes evenly distributed around the inner frame case.

3. The turbine engine of claim 1, wherein the outer frame case includes a plurality of bosses located on an outer surface of the outer frame case for attachment to each of the plurality of cooled spokes.

4. The turbine engine of claim 1, wherein the second spool further comprises:
a gearbox connected to at least one of the low pressure compressor and low pressure turbine; and
a fan connected to the gearbox.

5. A mid-turbine frame located in a gas turbine engine axially aft of a high pressure turbine and fore of a low pressure turbine, the mid-turbine frame comprising:
an outer frame case;
an inner frame case; and
a plurality of hollow spokes each having a spoke wall with a radially outer end and a radially inner end, the spoke wall being attached between the outer frame case and the inner frame case to distribute force from the inner frame case to the outer frame case, wherein each of the plurality of hollow spokes is configured to receive a cooling airflow therethrough;
wherein the inner frame case includes a manifold defined by an outer diameter annular wall, an inner diameter annular wall, and first and second axial walls of the inner frame case that extend radially between the outer diameter annular wall and the inner diameter annular wall; and
wherein a radially inner end of the spoke wall of each of the plurality of hollow spokes meets the outer diameter annular wall of the manifold at an opening in the outer diameter annular wall of the manifold and terminates radially between a radially outer surface of the outer diameter annular wall and a radially inner surface of the outer diameter annular wall to define an airflow path from each of the plurality of hollow spokes into the manifold that allows the manifold to receive and combine the cooling airflow provided via the plurality of hollow spokes.

6. The mid-turbine frame of claim 5, wherein the mid-turbine frame includes three or more of the plurality of hollow spokes evenly distributed around the inner frame case.

7. The mid-turbine frame of claim 5, wherein the outer frame case includes a plurality of bosses located on an outer surface of the outer frame case for attachment to each of the plurality of hollow spokes.

8. The mid-turbine frame of claim 5, wherein the high pressure turbine is connected to a high pressure compressor.

9. The mid-turbine frame of claim 5, wherein the low pressure turbine is connected to a low pressure compressor.

10. The mid-turbine frame of claim 9, wherein the low pressure turbine is connected to a fan through a gearbox.

\* \* \* \* \*